US010367965B2

(12) United States Patent
Cheng et al.

(10) Patent No.: US 10,367,965 B2
(45) Date of Patent: Jul. 30, 2019

(54) IMAGE SCANNING DEVICE AND SHEET FEEDING METHOD APPLIED THEREIN (71) Applicant: Foxlink Image Technology Co., Ltd., New Taipei (TW)

(72) Inventors: Chun Huei Cheng, New Taipei (TW); Chang Hsien Sung, New Taipei (TW); Yung Wen Lee, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 15/862,675

(22) Filed: Jan. 5, 2018

(65) Prior Publication Data
US 2018/0288268 A1 Oct. 4, 2018

(30) Foreign Application Priority Data

Mar. 28, 2017 (TW) .............................. 106110396 A (51) Int. Cl.
*H04N 1/12* (2006.01)
*H04N 1/00* (2006.01)

(52) U.S. Cl.
CPC ....... *H04N 1/1215* (2013.01); *H04N 1/00588* (2013.01); *H04N 1/00602* (2013.01); *H04N 1/00628* (2013.01); *H04N 1/00716* (2013.01); *H04N 1/00779* (2013.01)

(58) Field of Classification Search
None
See application file for complete search history.

(56) References Cited

U.S. PATENT DOCUMENTS

| 5,610,731 | A | * | 3/1997 | Itoh | ........................ | H04N 1/031 |
| | | | | | | 358/474 |
| 2009/0166961 | A1 | * | 7/2009 | Namikawa | ........... | H04N 1/0057 |
| | | | | | | 271/259 |
| 2014/0160502 | A1 | * | 6/2014 | Choi | ...................... | B65H 37/00 |
| | | | | | | 358/1.13 |

* cited by examiner

*Primary Examiner* — Frantz Bataille
(74) *Attorney, Agent, or Firm* — Lin & Associates Intellectual Property, Inc.

(57) ABSTRACT

An image scanning device includes an upper shell, a feeding shaft pivotally connected to the upper shell, a feeding roller mounted around the feeding shaft, a sensing roller, a motor, a lower shell pivotally covered to the upper shell, a plurality of springs and a contact image sensor. The sensing roller is mounted around the feeding shaft. The motor is connected with the feeding shaft. The motor drives the feeding shaft to rotate in different speeds. The plurality of the springs are mounted to the lower shell. The contact image sensor is mounted to the plurality of the springs. A top surface of the contact image sensor is capable of abutting against lower portions of outer surfaces of the feeding roller and the sensing roller by virtue of the plurality of the springs elastically abutting against a bottom surface of the contact image sensor.

18 Claims, 7 Drawing Sheets

| Thickness of Sheet | Image Read Value Range |
|---|---|
| Normal Paper (0.1mm) | 210~229 |
| Card (0.8mm) | 175~194 |

FIG. 7

IMAGE SCANNING DEVICE AND SHEET FEEDING METHOD APPLIED THEREIN

CROSS-REFERENCE TO RELATED APPLICATION

The present application is based on, and claims priority from, Taiwan Patent Application No. 106110396, filed Mar. 28, 2017, the disclosure of which is hereby incorporated by reference herein in its entirety.

BACKGROUND OF THE INVENTION

1. Field of the Invention

The present invention generally relates to an image scanning device and a sheet feeding method applied therein, and more particularly to an image scanning device capable of automatically detecting thicknesses of sheets which are to be scanned to automatically adjust feeding speeds of the sheets which are to be scanned, and a sheet feeding method applied therein for realizing successfully feeding the sheets which are to be scanned and have different thicknesses to complete scanning the sheets effectively.

2. The Related Art

Generally, a conventional image scanning device drives a transmission system by virtue of a motor to drive a feeding roller for feeding sheets which are to be scanned one after another. When the sheet which is to be scanned is thicker, a needed torsion of the motor is larger, a current of the motor need be increased for realizing that the needed torsion of the motor is larger. In order to ensure that the sheets which are to be scanned and have different thicknesses are capable of being fed successfully by the conventional image scanning device, a power system is disposed to provide the needed largest current for the thicker sheet which is to be scanned so as to provide the largest torsion of the motor, so a constant current value is provided for the motor so as to realize a constant torsion of the motor and provide a constant feeding speed of the feeding roller to feed the sheets which are to be scanned and have the thicknesses of being less than or equal to a set thickness.

However, because usage environments of the conventional image scanning device are increased, in order to carry the conventional image scanning device conveniently, the conventional image scanning device becomes smaller and smaller, and correspondingly a conventional portable image scanning device is emerged, the conventional portable image scanning device provides power by a current USB interface, nevertheless, an electrical power provided by the current USB interface is 2.5 W, a power supply is limited, when the thicker sheet which is to be scanned need be fed, a feeding speed of the thicker sheet need be slowed down and the torsion of the motor need be increased to realize feeding the thicker paper which is to be scanned. In another case, because the current provided by the power system is limited, the conventional image scanning device judges the thicknesses of the sheets which are to be scanned and adjust the feeding speeds of the sheets which are to be scanned by virtue of manual labors that brings an inconvenience in use.

Thus, in order to solve the above-mentioned problems, the present invention provides an innovative image scanning device capable of automatically detecting the thicknesses of the sheets which are to be scanned to automatically adjust the feeding speeds of the sheets which are to be scanned, and a sheet feeding method applied therein for realizing successfully feeding the sheets which are to be scanned and have the different thicknesses to complete scanning the sheets effectively.

SUMMARY OF THE INVENTION

An object of the present invention is to provide an image scanning device. The image scanning device includes an upper shell, a feeding shaft pivotally connected to the upper shell, a feeding roller fastened to and mounted around the feeding shaft, a sensing roller, a motor, a lower shell pivotally covered to the upper shell, a plurality of springs and a contact image sensor. The feeding roller projects beyond a bottom surface of the upper shell. A diameter of the sensing roller is the same as a diameter of the feeding roller. The sensing roller is fastened to and mounted around the feeding shaft, and the sensing roller is located adjacent to one side of the feeding roller. The motor is connected with the feeding shaft. The motor drives the feeding shaft to rotate in different speeds and bring along the feeding roller and the sensing roller to rotate simultaneously. The plurality of the springs are mounted to the lower shell and are capable of stretching and retracting upward and downward with respect to the feeding shaft. The contact image sensor is mounted to the plurality of the springs and is capable of moving upward and downward with respect to the feeding shaft. A top surface of the contact image sensor faces to lower portions of outer surfaces of the feeding roller and the sensing roller, and the top surface of the contact image sensor is capable of abutting against the lower portions of the outer surfaces of the feeding roller and the sensing roller by virtue of the plurality of the springs elastically abutting against a bottom surface of the contact image sensor.

Another object of the present invention is to provide a sheet feeding method applied in an image scanning device for scanning sheets. The image scanning device includes a roller element, a contact image sensor, a plurality of springs, and a motor driving the roller element to rotate in different speeds. The contact image sensor is mounted to the plurality of the springs. A top surface of the contact image sensor is capable of abutting against a lower portion of an outer surface of the roller element. Specific steps of the sheet feeding method are described hereinafter. Drive each of the sheets which are to be scanned to be fed forward to a preset position by virtue of the roller element rotating. Each of the sheets which are to be scanned pushes against the contact image sensor to move downward. The plurality of the springs are compressed. An interval is formed between the lower portion of the outer surface of the roller element and the top surface of the contact image sensor. Reading image read values of the outer surface of the roller element, and the contact image sensor records the image read values of the outer surface of the roller element at different intervals, namely different distances of which each is between the outer surface of the roller element and the top surface of the contact image sensor, confirm the distances of which each is between the outer surface of the roller element and the top surface of the contact image sensor according to the image read values of the outer surface of the roller element, namely thicknesses of the fed sheets which are to be scanned. According to the different intervals of which each is between the outer surface of the roller element and the top surface of the contact image sensor, different feeding speeds are separately set corresponding to rotation speeds of the motor. According to the thicknesses of the fed sheets which are to be scanned, automatically choose corresponding feeding speeds to feed the sheets which are to be scanned so as to proceed with scanning.

Another object of the present invention is to provide a sheet feeding method applied in an image scanning device for scanning sheets. The image scanning device includes a feeding roller, a sensing roller, a contact image sensor, a plurality of springs, and a motor driving the feeding roller and the sensing roller to rotate in different speeds. The contact image sensor is mounted to the plurality of the springs. A top surface of the contact image sensor is capable of abutting against lower portions of outer surfaces of the feeding roller and the sensing roller. Drive each of the sheets which are to be scanned to be fed forward to a preset position by virtue of the feeding roller rotating. Each of the sheets which are to be scanned pushes against the contact image sensor to move downward, the plurality of the springs are compressed, an interval is formed between the lower portions of the outer surfaces of the feeding roller and the sensing roller, and the top surface of the contact image sensor. Read image read values of the outer surface of the sensing roller, the contact image sensor records the image read values of the outer surface of the sensing roller at different intervals, namely different distances of which each is between the outer surfaces of the feeding roller and the sensing roller, and the top surface of the contact image sensor, confirm the distances of which each is between the outer surfaces of the feeding roller and the sensing roller, and the top surface of the contact image sensor according to the image read values of the outer surface of the sensing roller, namely thicknesses of the fed sheets which are to be scanned. According to the different intervals of which each is between the outer surfaces of the feeding roller and the sensing roller, and the top surface of the contact image sensor, different feeding speeds are separately set corresponding to rotation speeds of the motor. According to the thicknesses of the fed sheets which are to be scanned, automatically choose corresponding feeding speeds to feed the sheets which are to be scanned so as to proceed with scanning.

As described above, the image scanning device applies the sheet feeding method to set the different feeding speeds according to the different intervals of which each is between the outer surfaces of the feeding roller and the sensing roller, and the top surface of the contact image sensor by virtue of the contact image sensor recording the image read values at the different intervals (namely the different distances) of which each is between the outer surfaces of the feeding roller and the sensing roller, and the top surface of the contact image sensor before scanning. Furthermore, read the image read values of the outer surface of the sensing roller, confirm the distances of which each is between the outer surfaces of the feeding roller and the sensing roller, and the top surface of the contact image sensor according to the image read values of the outer surface of the sensing roller, namely the thicknesses of the fed sheets which are to be scanned, and then according to the thicknesses of the fed sheets which are to be scanned, automatically choose corresponding feeding speeds to feed the sheets which are to be scanned so as to proceed scanning. As a result, the image scanning device is capable of automatically detecting the thicknesses of the sheets which are to be scanned to automatically adjust the feeding speeds of the sheets which are to be scanned, and the sheet feeding method applied in the image scanning device for realizing successfully feeding the sheets which are to be scanned and have different thicknesses to complete scanning the sheets effectively.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
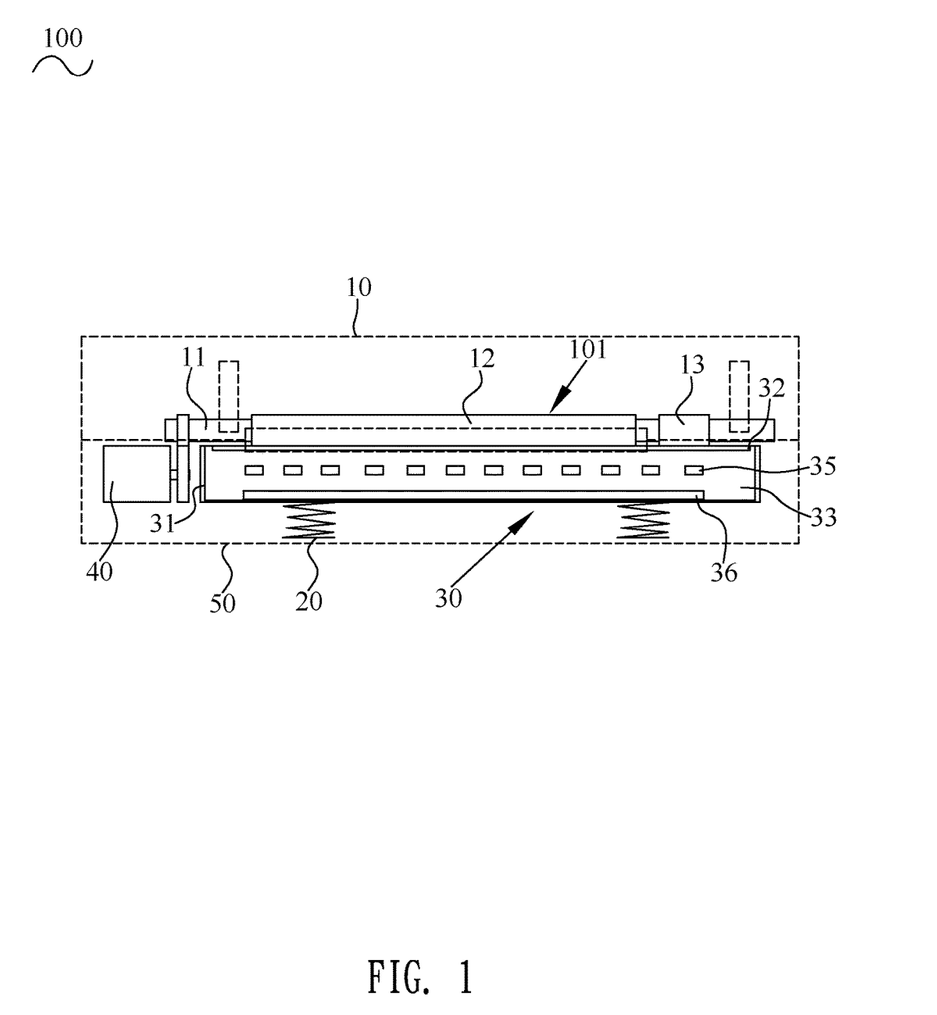
FIG. 1 is a schematic diagram of an image scanning device applying a sheet feeding method in accordance with a preferred embodiment of the present invention.
Figure 2:
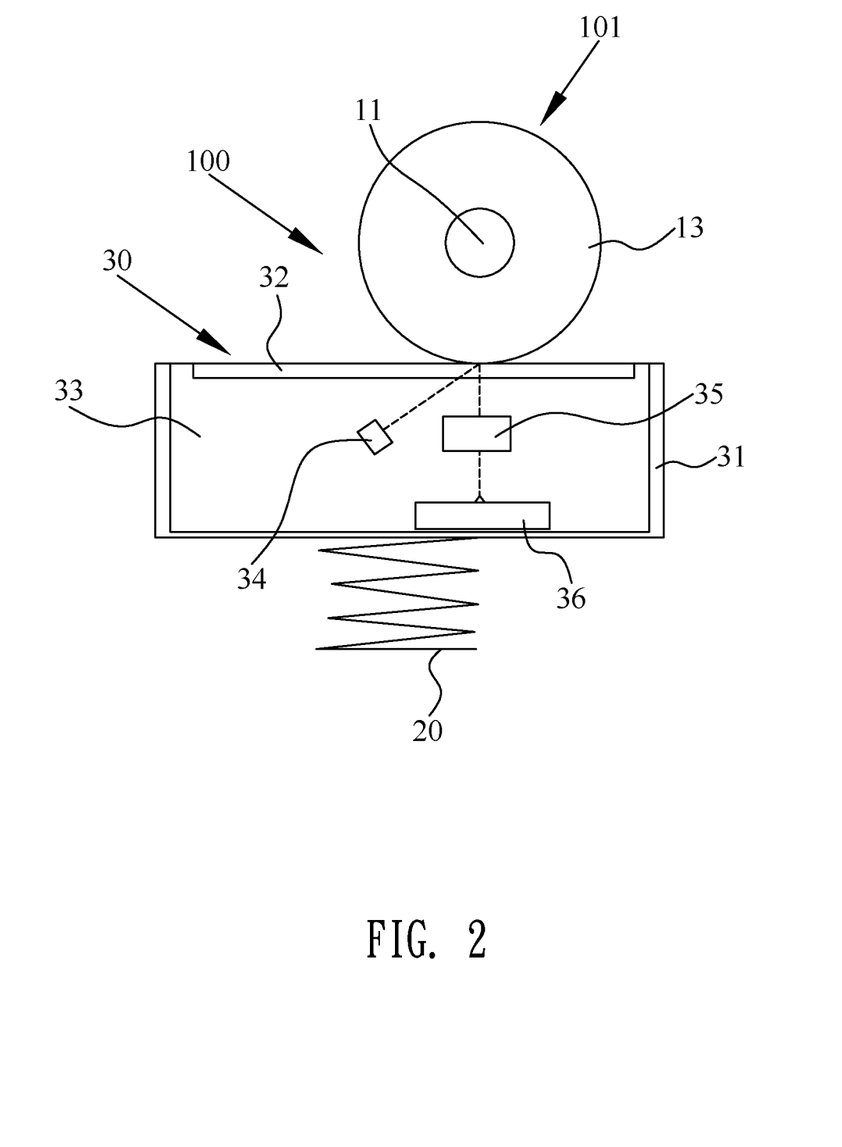
FIG. 2 is a partial structure schematic diagram of the image scanning device applying the sheet feeding method in accordance with the preferred embodiment of the present invention.
Figure 5:
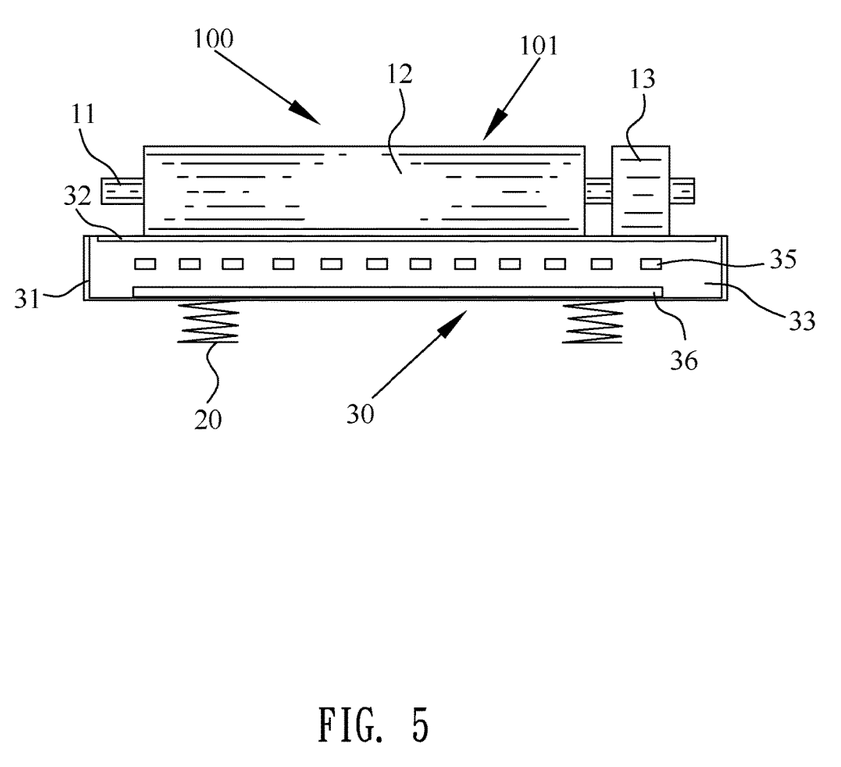
FIG. 5 is another angle partial structure schematic diagram of the image scanning device of FIG. 2, wherein the image scanning device is without a light source.

With reference to FIG. 1, FIG. 2 and FIG. 5, an image scanning device 100 in accordance with a preferred embodiment of the present invention is shown. The image scanning device 100 includes an upper shell 10, a roller element 101, a feeding shaft 11, a plurality of springs 20, a contact image sensor 30, a motor 40 and a lower shell 50. The roller element 101 includes a feeding roller 12 and a sensing roller 13.

Referring to FIG. 1 to FIG. 6 again, the feeding shaft 11 is pivotally connected to the upper shell 10. The feeding roller 12 is fastened to and mounted around the feeding shaft 11, and the feeding roller 12 projects beyond a bottom surface of the upper shell 10. A diameter of the sensing roller 13 is the same as a diameter of the feeding roller 12. An outer surface of the sensing roller 13 is white. The sensing roller 13 is fastened to and mounted around the feeding shaft 11, and the sensing roller 13 is located adjacent to one side of the feeding roller 12. The sensing roller 13 is spaced from the one side of the feeding roller 12. The motor 40 is connected with the feeding shaft 11. The motor 40 drives the feeding shaft 11 to rotate in different speeds and bring along the feeding roller 12 and the sensing roller 13 to rotate simultaneously. The motor 40 drives roller element 101 to rotate in the different speeds by virtue of the feeding shaft 11. The motor 40 drives the feeding roller 12 and the sensing roller 13 to rotate in the different speeds by virtue of the feeding shaft 11.

The lower shell 50 is pivotally covered to the upper shell 10. The plurality of the springs 20 are mounted to the lower shell 50 and are capable of stretching and retracting upward and downward with respect to the feeding shaft 11. The contact image sensor 30 is mounted to the plurality of the springs 20 and is capable of moving upward and downward with respect to the feeding shaft 11. A top surface of the contact image sensor 30 faces to a lower portion of an outer surface of the roller element 101, and the top surface of the contact image sensor 30 is capable of abutting against the lower portion of the outer surface of the roller element 101 by virtue of the plurality of the springs 20 elastically abutting against a bottom surface of the contact image sensor 30. The top surface of the contact image sensor 30 faces to lower portions of outer surfaces of the feeding roller 12 and the sensing roller 13, and the top surface of the contact image sensor 30 is capable of abutting against the lower portions of the outer surfaces of the feeding roller 12 and the sensing roller 13 by virtue of the plurality of the springs 20 elastically abutting against the bottom surface of the contact image sensor 30.

The contact image sensor 30 includes a bracket 31, glass 32, a light guide element 34, a plurality of self-focusing lenses 35 and a light receiving element 36. The bracket 31 is of a U shape. The bracket 31 is capable of being mounted to the plurality of the springs 20 and moving upward and downward. The glass 32 is disposed to a top surface of the bracket 31. A top surface of the glass 32 is capable of abutting against the lower portion of the outer surface of the roller element 101. The top surface of the glass 32 is capable of abutting against the lower portions of the outer surfaces of the feeding roller 12 and the sensing roller 13. The bracket 31 cooperates with the glass 32 to form a receiving chamber 33 inside the bracket 31.

The light guide element 34 is received in the receiving chamber 33 and located under the glass 32. The light guide element 34 emits linear light penetrating through the glass 32 to the outer surfaces of the feeding roller 12 and the sensing roller 13. The plurality of the self-focusing lenses 35 are received in the receiving chamber 33 and arranged transversely, and the plurality of the self-focusing lenses 35 are located under the glass 32. The light receiving element 36 is received in the receiving chamber 33 and located under the plurality of the self-focusing lenses 35. The light receiving element 36 receives reflected light from the outer surfaces of the feeding roller 12 and the sensing roller 13 by virtue of the corresponding plurality of the self-focusing lenses 35. So a distance between the outer surface of the roller element 101 and the top surface of the glass 32 is judged according to brightness variations of images of the outer surface of the roller element 101.

Referring to FIG. 1 to FIG. 7, a sheet feeding method applied in the image scanning device 100 in accordance with the present invention for scanning sheets 200 is shown. Specific steps of the sheet feeding method are described as follows.

Figure 3:
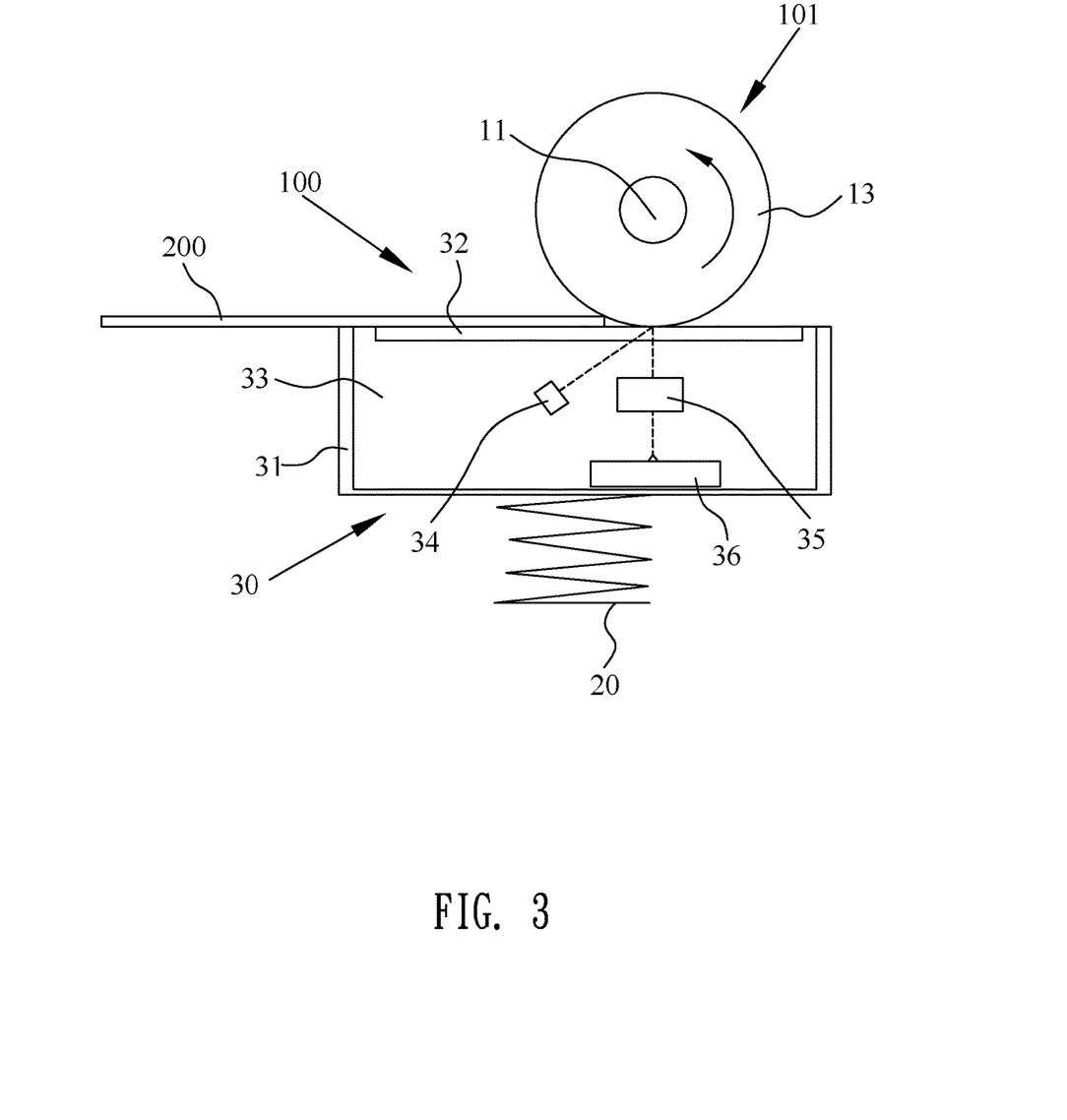
FIG. 3 is a partial schematic diagram of the image scanning device of FIG. 2, wherein the image scanning device applies the sheet feeding method to prepare to proceed with scanning sheets which are to be scanned.

Firstly, before scanning, torsions of the motor 40 are enough to bring along all kinds of the sheets 200, each of the sheets 200 which are to be scanned is brought under the feeding roller 12 and the sensing roller 13 in a low speed, and each of the sheets 200 which are to be scanned is stopped to the top surface of the glass 32 of the contact image sensor 30. The image scanning device 100 proceeds with automatically detecting a thickness of each of the sheets 200 which are to be scanned according to a depth of intensity (DOI) principle.

Figure 4:
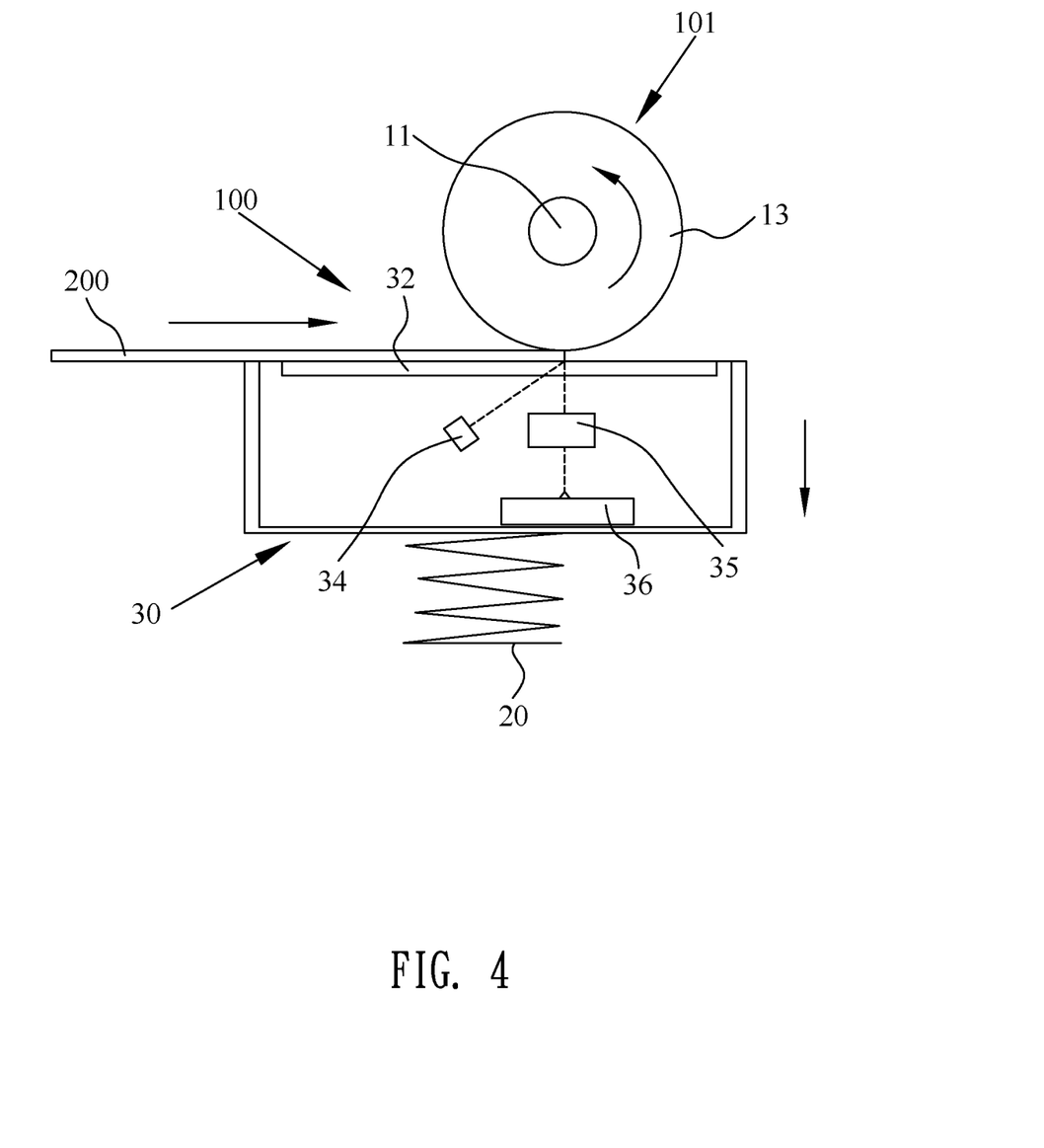
FIG. 4 is a partial schematic diagram of the image scanning device of FIG. 3, wherein the image scanning device scans the sheets which are to be scanned.
Figure 6:
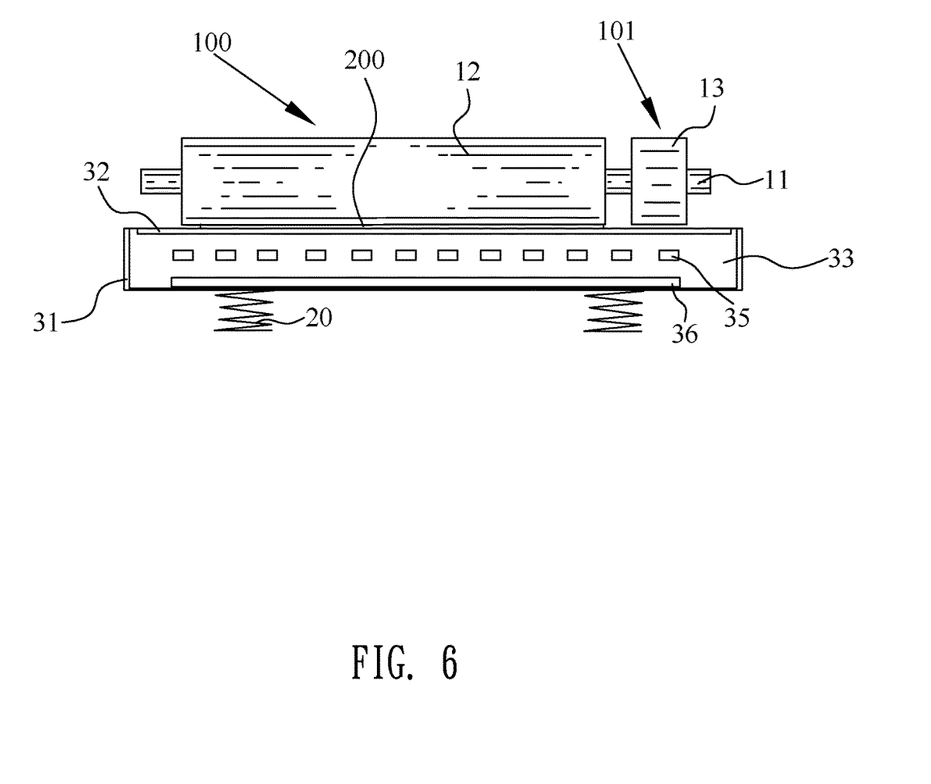
FIG. 6 is another angle partial schematic diagram of the image scanning device of FIG. 4, wherein the image scanning device scans the sheets which are to be scanned.

Specifically, drive each of the sheets 200 which are to be scanned to be fed forward to a preset position by virtue of the feeding roller 12 of the roller element 101 rotating, each of the sheets 200 which are to be scanned pushes against the contact image sensor 30 to move downward, the plurality of the springs 20 are compressed, an interval is formed between the lower portion of the outer surface of the roller element 101 and the top surface of the contact image sensor 30. Specifically, the interval is formed between the lower portion of the outer surface of the roller element 101 and the top surface of the glass 32 of the contact image sensor 30. In the preferred embodiment, the interval is formed between the lower portions of the outer surfaces of the feeding roller 12 and the sensing roller 13, and the top surface of the contact image sensor 30. Specifically, the interval is formed between the lower portions of the outer surfaces of the feeding roller 12 and the sensing roller 13, and the top surface of the glass 32 of the contact image sensor 30.

Secondly, read image read values of the outer surface of the roller element 101, and the contact image sensor 30 records the image read values of the outer surface of the roller element 101 at different intervals (namely different distances) of which each is between the outer surface of the roller element 101 and the top surface of the contact image sensor 30, confirm the distances of which each is between the outer surface of the roller element 101 and the top surface of the contact image sensor 30 according to the image read values of the outer surface of the roller element 101, namely thicknesses of the fed sheets 200 which are to be scanned. In the preferred embodiment, read image read values of the outer surface of the sensing roller 13, the contact image sensor 30 records the image read values of the outer surface of the sensing roller 13 at the different intervals (namely the different distances) of which each is between the outer surfaces of the feeding roller 12 and the sensing roller 13, and the top surface of the contact image sensor 30, confirm the distances of which each is between the outer surfaces of the feeding roller 12 and the sensing roller 13, and the top surface of the contact image sensor 30 according to the image read values of the outer surface of the sensing roller 13, namely the thicknesses of the fed sheets 200 which are to be scanned.

In the preferred embodiment, the contact image sensor 30 records the image read values of the outer surface of the sensing roller 13 at the different intervals (namely the different distances) of which each is between the outer surfaces of the feeding roller 12 and the sensing roller 13, and the top surface of the contact image sensor 30 and which are 0.7 mm below and 0.7 mm above, so that a preset image read value is set and the preset image read value is distinguished from two thicknesses corresponding to the distances of being 0.7 mm below and 0.7 mm above. The preset image read value is (202).

Thirdly, according to the different intervals of which each is between the outer surface of the roller element 101 and the top surface of the contact image sensor 30, different feeding speeds are separately set corresponding to rotation speeds of the motor 40 driving the feeding shaft 11 to bring along the roller element 101. The different feeding speeds include two feeding speeds corresponding to two intervals of which each is between the outer surface of the roller element 101 and the top surface of the contact image sensor 30. Specifically, according to the different intervals of which each is between the outer surfaces of the feeding roller 12 and the sensing roller 13, and the top surface of the contact image sensor 30, the different feeding speeds are separately set corresponding to the rotation speeds of the motor 40 driving the feeding shaft 11 to bring along the feeding roller 12 and the sensing roller 13. In the preferred embodiment, the different feeding speeds include the two feeding speeds corresponding to the two intervals of which each is between the outer surfaces of the feeding roller 12 and the sensing roller 13, and the top surface of the contact image sensor 30. One of the two feeding speeds is to feed each of the sheets 200 which are to be scanned in a high speed, namely the motor 40 drives the feeding shaft 11 to bring along the feeding roller 12 and the sensing roller 13 to rotate in the high speed. The other feeding speed is to feed each of the sheets 200 which are to be scanned in the low speed, namely the motor 40 drives the feeding shaft 11 to bring along the feeding roller 12 and the sensing roller 13 to rotate in the low speed.

When one of the image read values of the outer surface of the roller element 101 is more than or equal to the preset image read value, namely one of the intervals of which each is between the outer surface of the roller element 101 and the top surface of the contact image sensor 30 is denoted to be smaller, one of the sheets 200 which are to be scanned is thinner, choose feeding the one of the sheets 200 which are to be scanned in the high speed so as to keep proceeding with scanning in a higher scanning speed. When the one of the image read values of the outer surface of the roller element 101 is smaller than the preset image read value, namely the one of the intervals of which each is between the outer surface of the roller element 101 and the top surface of the contact image sensor 30 is denoted to be larger, the one of the sheets 200 which are to be scanned is thicker, a problem of lacking of torsion will be caused to make the one of the sheets 200 which are to be scanned have no way of being fed forward to proceed with scanning the one of the sheets 200 which are to be scanned, at the moment, the low speed is chosen to feed the one of the sheets 200 which are to be scanned, so that the one of the sheets 200 which are to be scanned is ensured to be fed forward. The best feeding speed is automatically adjusted under a limited power supply to feed each of the sheets 200 which are to be scanned successfully.

In the preferred embodiment, when one of the image read values of the outer surface of the sensing roller 13 is more than or equal to the preset image read value which is (202), namely the one of the intervals of which each is between the outer surfaces of the feeding roller 12 and the sensing roller 13, and the top surface of the contact image sensor 30 is denoted to be smaller, the one of the sheets 200 which are to be scanned is thinner, choose feeding the one of the sheets 200 which are to be scanned in the high speed so as to keep proceeding with scanning in the higher scanning speed. When the one of the image read values of the outer surface of the sensing roller 13 is smaller than the preset image read value which is (202), namely the one of the intervals of which each is between the outer surfaces of the feeding roller 12 and the sensing roller 13, and the top surface of the contact image sensor 30 is denoted to be larger, the one of the sheets 200 which are to be scanned is thicker, the problem of lacking of torsion will be caused to make the one of the sheets 200 which are to be scanned have no way of being fed forward to proceed with scanning the one of the sheets 200 which are to be scanned, at the moment, the low speed is chosen to feed the one of the sheets 200 which are to be scanned, so that the one of the sheets 200 which are to be scanned is ensured to be fed forward. The best feeding speed is automatically adjusted under the limited power supply to feed each of the sheets 200 which are to be scanned successfully.

Fourthly, according to the thicknesses of the fed sheets 200 which are to be scanned, automatically choose corresponding feeding speeds to feed the sheets 200 which are to be scanned so as to proceed with scanning.

Figure 7:
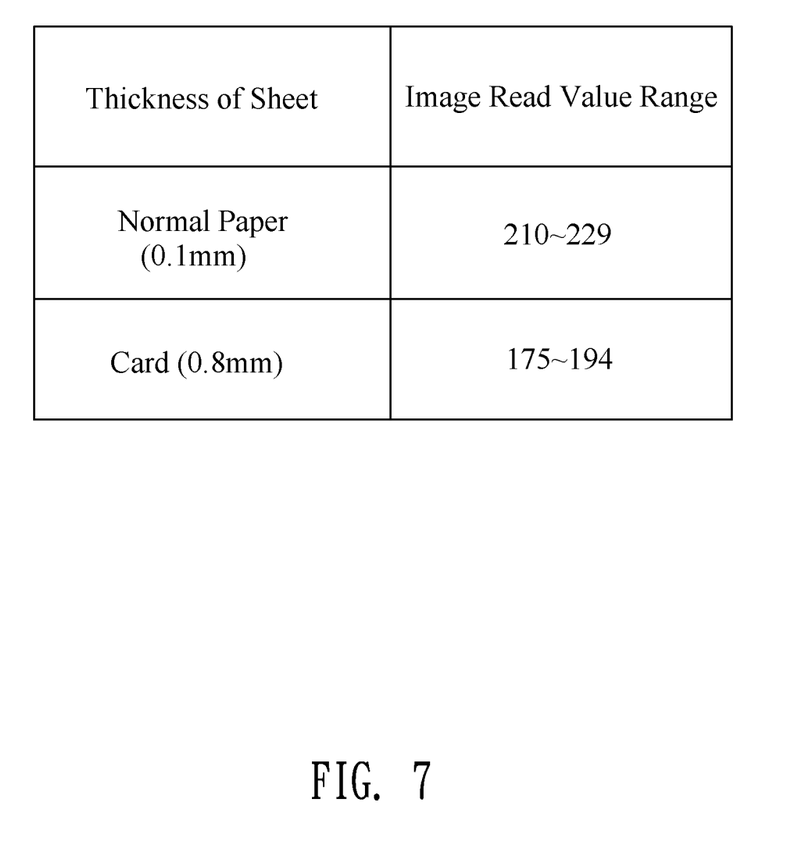
FIG. 7 is a form of two ranges of image read values of the image scanning device in accordance with the preferred embodiment of the present invention, wherein the image scanning device scans the sheets which are ordinary paper and cards.

Referring to FIG. 1 to FIG. 7, a form of two ranges of the image read values of the outer surface of the sensing roller 13 of the image scanning device 100 is shown in FIG. 7. When each of the sheets 200 is a normal A4 paper, namely the thickness of the sheet 200 is 0.1 mm, one range of the image read values of the outer surface of the sensing roller 13 is (210-229). When each of the sheets 200 is a card, namely the thickness of each of the sheets 200 is 0.8 mm, the other range of the image read values of the outer surface of the sensing roller 13 is (175-194), so when each of the sheets 200 is the normal A4 paper, choose feeding each of the sheets 200 in the high speed, when each of the sheets 200 is the card, choose feeding each of the sheets 200 in the low speed.

In the preferred embodiment, two preferable feeding speeds for feeding the sheets 200 are included and corresponding to two intervals of which each is between the outer surfaces of the feeding roller 12 and the sensing roller 13, and the top surface of the contact image sensor 30, but the feeding speeds for feeding the sheets 200 are without being limited to the two feeding speeds corresponding to the two intervals of which each is between the outer surfaces of the feeding roller 12 and the sensing roller 13, and the top surface of the contact image sensor 30. The most reasonable feeding speeds for feeding the sheets 200 are capable of being disposed respectively corresponding to the intervals of 0.25 mm and 0.5 mm, namely the thicknesses of 0.25 mm and 0.5 mm. When the thickness of each of the sheets 200 is 0.25 mm or 0.5 mm, respectively choose the corresponding feeding speed to feed each of the sheets 200 so as to scan each of the sheets 200.

As described above, the image scanning device 100 applies the sheet feeding method to set the different feeding speeds according to the different intervals of which each is between the outer surfaces of the feeding roller 12 and the sensing roller 13, and the top surface of the contact image sensor 30 by virtue of the contact image sensor 30 recording the image read values at the different intervals (namely the different distances) of which each is between the outer surfaces of the feeding roller 12 and the sensing roller 13, and the top surface of the contact image sensor 30 before scanning. Furthermore, read the image read values of the outer surface of the sensing roller 13, confirm the distances of which each is between the outer surfaces of the feeding roller 12 and the sensing roller 13, and the top surface of the contact image sensor 30 according to the image read values of the outer surface of the sensing roller 13, namely the thicknesses of the fed sheets 200 which are to be scanned, and then according to the thicknesses of the fed sheets 200 which are to be scanned, automatically choose corresponding feeding speeds to feed the sheets 200 which are to be scanned so as to proceed with scanning. As a result, the image scanning device 100 is capable of automatically detecting the thicknesses of the sheets 200 which are to be scanned to automatically adjust the feeding speeds of the sheets 200 which are to be scanned, and the sheet feeding method applied in the image scanning device 100 for realizing successfully feeding the sheets 200 which are to be scanned and have different thicknesses to complete scanning the sheets 200 effectively.

What is claimed is:

1. An image scanning device, comprising:
   an upper shell;
   a feeding shaft pivotally connected to the upper shell;
   a roller element including a feeding roller and a sensing roller both fastened to and mounted around the feeding shaft, a diameter of the sensing roller being the same as a diameter of the feeding roller, the sensing roller being located adjacent to one side of the feeding roller and the feeding roller projecting beyond a bottom surface of the upper shell;

a motor connected with the feeding shaft, the motor driving the feeding shaft to rotate in different speeds and bring along the feeding roller and the sensing roller to rotate simultaneously;

a lower shell pivotally covered to the upper shell;

a plurality of springs mounted to the lower shell and being capable of stretching and retracting upward and downward with respect to the feeding shaft; and a contact image sensor mounted to the plurality of the springs and being capable of moving upward and downward with respect to the feeding shaft, a top surface of the contact image sensor facing to a lower portion of an outer surface of the roller element, and the top surface of the contact image sensor being capable of abutting against the lower portion of the outer surface of the roller element by virtue of the plurality of the springs elastically abutting against a bottom surface of the contact image sensor;

wherein the contact image sensor includes a light guide element and a light receiving element, the light guide element emits a light to the outer surface of the roller element, and the light receiving element receives a reflected light from the outer surface of the roller element and records an image read value to determine an interval between the outer surface of the roller element and the top surface of the contact image sensor.

2. The image scanning device as claimed in claim 1, wherein the contact image sensor includes a bracket and glass, the bracket is capable of being mounted to the plurality of the springs and moving upward and downward, the glass is disposed to a top surface of the bracket, and the bracket cooperates with the glass to form a receiving chamber inside the bracket.

3. The image scanning device as claimed in claim 2, wherein the contact image sensor further includes a plurality of self-focusing lenses, the light guide element is received in the receiving chamber and located under the glass, the light guide element emits a linear light penetrating through the glass to the outer surfaces of the feeding roller and the sensing roller, the plurality of the self-focusing lenses are received in the receiving chamber and arranged transversely, and the plurality of the self-focusing lenses are located under the glass, the light receiving element is received in the receiving chamber and located under the plurality of the self-focusing lenses, and the light receiving element receives reflected light from the outer surfaces of the feeding roller and the sensing roller by virtue of the corresponding plurality of the self-focusing lenses.

4. The image scanning device as claimed in claim 2, wherein a top surface of the glass is capable of abutting against the lower portions of the outer surfaces of the feeding roller and the sensing roller.

5. A sheet feeding method applied in an image scanning device for scanning sheets, the image scanning device including a roller element, a contact image sensor, a plurality of springs, and a motor driving the roller element to rotate in different speeds, the contact image sensor being mounted to the plurality of the springs, a top surface of the contact image sensor being capable of abutting against a lower portion of an outer surface of the roller element, the contact image sensor having a light guide element and a light receiving element, the light guide element emitting a light to the outer surface of the roller element, the light receiving element receiving a reflected light from the outer surface of the roller element and recording an image read value to determine an interval between the outer surface of the roller element and the top surface of the contact image sensor, the sheet feeding method comprising the steps of:

driving each of the sheets which are to be scanned to be fed forward to a preset position by virtue of the roller element rotating, each of the sheets which are to be scanned pushing against the contact image sensor to move downward, the plurality of the springs being compressed, an interval being formed between the lower portion of the outer surface of the roller element and the top surface of the contact image sensor;

reading image read values of the outer surface of the roller element, and the contact image sensor recording the image read values of the outer surface of the roller element at different intervals, namely different distances of which each is between the outer surface of the roller element and the top surface of the contact image sensor, confirming the distances of which each is between the outer surface of the roller element and the top surface of the contact image sensor according to the image read values of the outer surface of the roller element, namely thicknesses of the fed sheets which are to be scanned;

according to the different intervals of which each is between the outer surface of the roller element and the top surface of the contact image sensor, different feeding speeds being separately set corresponding to rotation speeds of the motor; and according to the thicknesses of the fed sheets which are to be scanned, automatically choosing corresponding feeding speeds to feed the sheets which are to be scanned so as to proceed with scanning.

6. The sheet feeding method as claimed in claim 5, wherein the roller element includes a feeding roller and a sensing roller, the top surface of the contact image sensor faces to lower portions of outer surfaces of the feeding roller and the sensing roller, and the top surface of the contact image sensor is capable of abutting against the lower portions of the outer surfaces of the feeding roller and the sensing roller by virtue of the plurality of the springs elastically abutting against a bottom surface of the contact image sensor.

7. The sheet feeding method as claimed in claim 6, wherein the outer surface of the sensing roller is white.

8. The sheet feeding method as claimed in claim 5, wherein the different feeding speeds include two feeding speeds corresponding to two intervals of which each is between the outer surface of the roller element and the top surface of the contact image sensor, one of the two feeding speeds is to feed each of the sheets which are to be scanned in a high speed, and the other feeding speed is to feed each of the sheets which are to be scanned in a low speed.

9. The sheet feeding method as claimed in claim 8, wherein a preset image read value is set, when one of the image read values of the outer surface of the roller element is more than or equal to the preset image read value, namely one of the intervals of which each is between the outer surface of the roller element and the top surface of the contact image sensor is denoted to be smaller, which indicates that one of the sheets which are to be scanned is thinner, feeding the one of the sheets which are to be scanned is set in the high speed, and when the one of the image read values of the outer surface of the roller element is smaller than the preset image read value, namely the one of the intervals of which each is between the outer surface of the roller element and the top surface of the contact image sensor is denoted to be larger, which indicates that the one of the sheets which are to be scanned is thicker, the low speed is chosen to feed the one of the sheets which are to be scanned.

10. The sheet feeding method as claimed in claim 9, wherein the preset image read value is (202).

11. A sheet feeding method applied in an image scanning device for scanning sheets, the image scanning device including a roller element having a feeding roller and a sensing roller, a contact image sensor, a plurality of springs, and a motor driving the feeding roller and the sensing roller to rotate in different speeds, the contact image sensor being mounted to the plurality of the springs, a top surface of the contact image sensor being capable of abutting against lower portions of outer surfaces of the feeding roller and the sensing roller, the contact image sensor having a light guide element and a light receiving element, the light guide element emitting a light to the outer surface of the sensing roller, the light receiving element receiving a reflected light from the outer surface of the sensing roller and recording an image read value to determine an interval between the outer surface of the roller element and the top surface of the contact image sensor, the sheet feeding method comprising the steps of:

driving each of the sheets which are to be scanned to be fed forward to a preset position by virtue of the feeding roller rotating, each of the sheets which are to be scanned pushing against the contact image sensor to move downward, the plurality of the springs being compressed, an interval being formed between the lower portions of the outer surfaces of the feeding roller and the sensing roller, and the top surface of the contact image sensor;

reading image read values of the outer surface of the sensing roller, the contact image sensor recording the image read values of the outer surface of the sensing roller at different intervals, namely different distances of which each is between the outer surfaces of the feeding roller and the sensing roller, and the top surface of the contact image sensor, confirming the distances of which each is between the outer surfaces of the feeding roller and the sensing roller, and the top surface of the contact image sensor according to the image read values of the outer surface of the sensing roller, namely thicknesses of the fed sheets which are to be scanned;

according to the different intervals of which each is between the outer surfaces of the feeding roller and the sensing roller, and the top surface of the contact image sensor, different feeding speeds being separately set corresponding to rotation speeds of the motor; and according to the thicknesses of the fed sheets which are to be scanned, automatically choosing corresponding feeding speeds to feed the sheets which are to be scanned so as to proceed with scanning.

12. The sheet feeding method as claimed in claim 11, wherein the outer surface of the sensing roller is white.

13. The sheet feeding method as claimed in claim 11, wherein the different feeding speeds include two feeding speeds corresponding to two intervals of which each is between the outer surfaces of the feeding roller and the sensing roller, and the top surface of the contact image sensor, one of the two feeding speeds is to feed each of the sheets which are to be scanned in a high speed, and the other feeding speed is to feed each of the sheets which are to be scanned in a low speed.

14. The sheet feeding method as claimed in claim 11, wherein a preset image read value is set, when one of the image read values of the outer surface of the sensing roller is more than or equal to the preset image read value, namely one of the intervals of which each is between the outer surfaces of the feeding roller and the sensing roller, and the top surface of the contact image sensor is denoted to be smaller, which indicates that one of the sheets which are to be scanned is thinner, feeding the one of the sheets which are to be scanned is set in the high speed, and when the one of the image read values of the outer surface of the sensing roller is smaller than the preset image read value, namely the one of the intervals of which each is between the outer surfaces of the feeding roller and the sensing roller, and the top surface of the contact image sensor is denoted to be larger, which indicates that the one of the sheets which are to be scanned is thicker, the low speed is chosen to feed the one of the sheets which are to be scanned.

15. The sheet feeding method as claimed in claim 14, wherein the preset image read value is (202).

16. The sheet feeding method as claimed in claim 11, wherein the contact image sensor includes a bracket and glass, the bracket is capable of being mounted to the plurality of the springs and moving upward and downward, the glass is disposed to a top surface of the bracket, and the bracket cooperates with the glass to form a receiving chamber inside the bracket.

17. The sheet feeding method as claimed in claim 16, wherein the contact image sensor further includes a plurality of self-focusing lenses, the light guide element is received in the receiving chamber and located under the glass, the light guide element emits linear light penetrating through the glass to the outer surfaces of the feeding roller and the sensing roller, the plurality of the self-focusing lenses are received in the receiving chamber and arranged transversely, and the plurality of the self-focusing lenses are located under the glass, the light receiving element is received in the receiving chamber and located under the plurality of the self-focusing lenses, and the light receiving element receives reflected light from the outer surfaces of the feeding roller and the sensing roller by virtue of the corresponding plurality of the self-focusing lenses.

18. The sheet feeding method as claimed in claim 16, wherein a top surface of the glass is capable of abutting against the lower portions of the outer surfaces of the feeding roller and the sensing roller.

* * * * *